United States Patent
Loison

(10) Patent No.: US 12,093,177 B2
(45) Date of Patent: Sep. 17, 2024

(54) MULTI-LEVEL PARTITIONED SNOOP FILTER

(71) Applicant: ARTERIS, INC., Campbell, CA (US)

(72) Inventor: Jean-Philippe Loison, San Jose, CA (US)

(73) Assignee: ARTERIS, INC., Campbell, CA (US)

(*) Notice: Subject to any disclaimer, the term of this patent is extended or adjusted under 35 U.S.C. 154(b) by 22 days.

(21) Appl. No.: 17/953,475

(22) Filed: Sep. 27, 2022

(65) Prior Publication Data

US 2023/0100746 A1 Mar. 30, 2023

Related U.S. Application Data

(60) Provisional application No. 63/249,077, filed on Sep. 28, 2021.

(51) Int. Cl.
*G06F 12/0815* (2016.01)
*G06F 12/06* (2006.01)
*G06F 12/0884* (2016.01)

(52) U.S. Cl.
CPC ...... *G06F 12/0815* (2013.01); *G06F 12/0607* (2013.01); *G06F 12/0884* (2013.01)

(58) Field of Classification Search
CPC ............ G06F 12/0815; G06F 12/0607; G06F 12/0884; G06F 12/084; G06F 12/0842; G06F 12/0806; G06F 12/0831; G06F 12/0833
See application file for complete search history.

(56) References Cited

U.S. PATENT DOCUMENTS

| | | | | |
|---|---|---|---|---|
| 7,552,255 | B1* | 6/2009 | George | G06F 12/1036 710/52 |
| 2004/0117561 | A1* | 6/2004 | Quach | G06F 12/0831 711/146 |
| 2006/0294314 | A1* | 12/2006 | Cheng | G06F 12/0822 711/E12.028 |
| 2007/0233966 | A1* | 10/2007 | Chinthanmani | G06F 12/0831 711/146 |
| 2016/0188471 | A1* | 6/2016 | Forrest | G06F 12/0828 711/119 |
| 2017/0168939 | A1 | 6/2017 | Jalal et al. | |
| 2022/0156195 | A1* | 5/2022 | Palfer-Sollier | G06F 12/0833 |
| 2022/0164288 | A1* | 5/2022 | Ramagiri | G06F 12/0815 |
| 2023/0139212 | A1* | 5/2023 | Randall | G06F 12/0831 711/118 |

* cited by examiner

*Primary Examiner* — Tracy A Warren
(74) *Attorney, Agent, or Firm* — Jubin Dana; Dana Legal Services

(57) ABSTRACT

A system and method that partitions a snoop filter into sub-partitions that reflect an affinity between a given cluster of cache-coherent agents. The process of partitioning reduces messaging traffic between a cache coherent agents connected to a cache-coherent interconnect. A level of snoop filter partitioning using a range of addresses is disclosed. A unique way to define how many snoop filters are needed and which snoop filter is tracking which cache line, is disclosed. A hierarchy of snoop filters can be used with two levels: a cluster level and an interleaving level.

15 Claims, 4 Drawing Sheets

Example: partitioning of a snoop filter into 4 sub-filters. Assuming a cache line is 64 bytes. If one cache line is tracked by sub-filter N, the next cache line (in memory order) is tracked by sub-filter (N+1)%4.

MULTI-LEVEL PARTITIONED SNOOP FILTER

CROSS-REFERENCE TO RELATED APPLICATIONS

The present application claims the priority benefit of U.S. Provisional Application Ser. No. 63/249,077 filed on Sep. 28, 2021 and titled MULTI DIMENSIONAL SNOOP FILTER ORGANIZATION, the entire disclosure of which is incorporated by reference.

TECHNICAL FIELD

The present technology relates to the field of cache coherency, and more specifically related to reduce the number of messages within a cache coherent system that uses a snoop filter.

BACKGROUND

Cache memory is a small copy of a portion of a computer's main memory which is physically located closer to the processor and can be accessed more rapidly than the main memory, thus improving overall performance. Caches are also lines of data stored with a truncated address indicating where the data came from in main memory. When a snoop transaction occurs to a specific cache block, all snoop filters snoop based on the transaction. Then the snoopers look up their corresponding cache line tag to check whether it has the same cache block. Snoop protocols have a large broadcast overhead because each coherence request goes to all cores in the system. This has substantial network bandwidth and power implications. Write propagation in snoop protocols can be implemented by using either one of the following methods: Write-Update or Write-Invalidate methods.

In a cache coherent interconnect system, a set of connected coherent agents with internal caches are kept coherent with each other, so that when a memory location is updated by an agent (e.g., microprocessor), all the other agents can see the updated value, even if the memory location that was updated was already cached by another agent. Therefore, what is needed is system and method that adds an additional level of snoop filter partitioning, using a range of addresses and partitioning the snoop filter into sub-partitions that reflects the affinity between a given cluster of cache coherent agents and the range of addresses snooped, therefore reducing snoops (and traffic) between a cluster of cache coherent agents and the different snoop filters.

SUMMARY

In accordance with various embodiments and aspects of the invention, systems and methods are disclosed that add an additional level of snoop filter partitioning, based on a range of addresses. For a large cache coherent system, where the set of cache coherent agents connected to a cache coherent interconnect can be grouped into clusters, whereas the agents in a cluster are using mostly cache lines from a range of addresses, and where the bandwidth of messages within the cache coherent interconnect to the snoop filter is so that more than one snoop filter is needed, all working in parallel, to sustain the bandwidth required by the performance expected from the system. According to one or more aspects and embodiments of the invention, the invention comprises a way to define how many snoop filters are needed, and which snoop filter is tracking which cache line.

According to one or more aspects and embodiments of the invention, the invention proposes to create a hierarchy of snoop filters with two levels: a cluster level, and an interleaving level.

According to one or more aspects and embodiments of the invention, at the cluster level the invention defines groups of snoop filters. There will be as many cluster level snoop filter groups as there are clusters identified in the system.

According to one or more aspects and embodiments of the invention, although it will be the case in most situations, the invention does not require that a cluster need to have associated cache coherent agents; and it can be simply a set of ranges of addresses.

According to one or more aspects and embodiments of the invention, at the interleaving level, each group of cluster-level snoop filters can be further subdivided into interleaving level snoop filters, each such interleaving level snoop filter tracks a sub-set of addresses that belongs to the address range with affinity to the cluster, so that no two interleaving level snoop filters of a cluster level track the same address, and so that all interleaving level snoop filters of a cluster level track all addresses within the address range with affinity to the cluster.

According to one or more aspects and embodiments of the invention, given a unique address for each cache line, to select a snoop filter for tracking, the following process is applied: First, select the cluster level snoop filters group by checking to which address range the address belongs. Second, within the cluster level snoop filters group, select the interleaving level snoop filter that is tracking the corresponding address by applying a selection function to the cache line address minus the start address of the matching address range. The selection function can be as simple as a lookup on certain address bits, or a complex as a modulo function (typically for a non-power of 2 number of interleaving level snoop filters).

BRIEF DESCRIPTION OF THE DRAWINGS

In order to understand the invention more fully, reference is made to the accompanying drawings. The invention is described in accordance with the aspects and embodiments in the following description with reference to the drawings or figures, in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
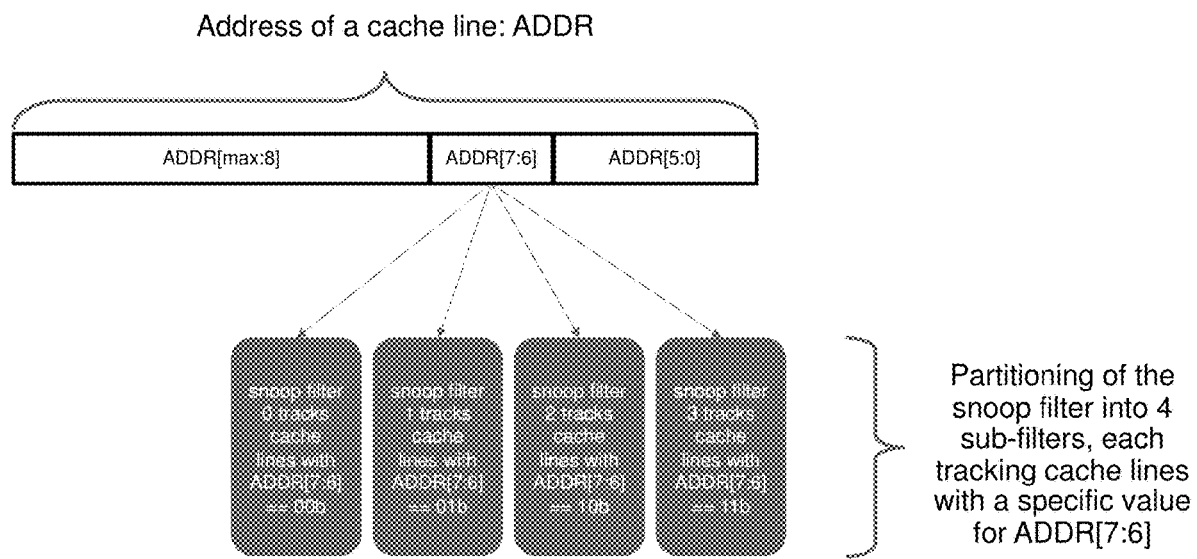
FIG. 1 shows a snoop filter partitioned by low order address bits of the cache lines.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

Cache memory is used to speed up memory access and overcome bottlenecks in a uniprocessor computer system. Each processor has its own private L1 cache memory that is very fast (but expensive). L2, L3, and L4 cache and main RAM memory are public, meaning that stored data is shared across all processors. These shared caches have more memory, are slower, and are less expensive. In order to keep the address information to a reasonable size, the cache can be divided into uniform size blocks, which are also called cache lines.

In a shared memory multiprocessor system with a small amount of L1 private cache memory for each processor, it is possible to have many copies of shared data: one copy in the main shared memory and one in the local, private L1 cache of each processor that requested it. When one of the copies of data is changed, the other copies must accurately and rapidly reflect that change. "Cache coherence" is the discipline which ensures that the changes in the values of shared operands (data) are propagated throughout the entire connected system in a timely fashion.

Snooping is a process where the individual caches monitor address lines for accesses to memory locations that they have cached. The write-invalidate and write-update cache coherence protocols make use of this mechanism. For the snooping mechanism, a snoop filter reduces the snooping traffic by maintaining a plurality of entries, each representing a cache line that may be owned by one or more nodes. When replacement of one of the entries is required, the snoop filter selects for the replacement of the entry representing the cache line or lines owned by the fewest nodes, as determined from a presence vector in each of the entries. A temporal or other type of algorithm can be used to refine the selection if more than one cache line is owned by the fewest nodes.

Snooping is a scheme by which a coherency controller (snooper) in a cache (a snoop cache) monitors or snoops and its goal is to maintain cache coherency in distributed shared memory systems.

On a local write "miss" (an attempt to write a value is made, but it's not in the cache), snooping protocols ensure that any copies in other caches are set to "invalid". "Invalid" means that a copy used to exist in the cache, but it is no longer current.

The advantage of using snooping is that it is faster than using a distributed shared memory system. Snooping is normally faster if there is enough bandwidth because all transactions are a request/response seen by all of the processors.

One way to reduce unnecessary snooping is to use a snoop filter. A snoop filter determines whether a snooper needs to check a cache tag or not. It means that the snoop filter knows which caches have a copy of a cache block. Thus, it can prevent the caches that do not have the copy of a cache block from making unnecessary snooping.

Coherence protocols apply cache coherence rules in multiprocessor systems. The goal is that two clients must never see different values for the same shared data. Implementation of cache coherence protocols consume a significant amount of on-chip bandwidth. Snoop protocols distribute the responsibility for assuring cache coherence between all cache controllers. Some mechanism must be incorporated so that each cache knows when a line also exists in another cache. If this line is subsequently updated, it must inform the other caches that this update has taken place.

When specific data is shared by several caches and a processor modifies a value of the shared data, then the change must be propagated to all of the other caches which have a copy of the data. The notification of data change can be done by snooping. All of the snoopers monitor every transaction. If a transaction modifying a shared cache block appears, all the snoopers check to see whether their caches have the same copy of the shared block. If a cache does have a copy of the shared block, the corresponding snooper performs an action to ensure cache coherency. The action can be a flush or an invalidation of the cache block. It can also involve a change of cache block state, depending on the specific cache coherence protocol that is used. The possible memory processing states comprise: "Read Hit" "Read Miss", "Write Hit", and "Write Miss".

One of the possible implementations of snoop protocols is as follows:

The cache line can have a Cache Tag with, for example, three additional bits:

V—Valid

D—Dirty bit (signifies that data in the cache is not the same as in main memory)

S—Shared

Each cache line exists in one of the following exclusive states: "Dirty" (has been updated by local processor), "Valid", "Invalid", or "Shared". A cache line contains a value, which can be read or written. Writing to a cache line changes the value. Each value is stored either in main memory, which is very slow to access, or in one or more local caches, which is fast to access. When a block is first loaded into the cache, it is initially marked as "Valid".

Cache Memory: A cache is a data-storage component that can be accessed faster or more efficiently than the original source of the data stored in main memory. It is a temporary holding location for information, so that repeated access to the same information can be acquired faster and with fewer resources. Cache simply holds duplicate copies of data that are also stored in a permanent memory store. Caches are also lines of data stored with a truncated address of where the data came from in the main memory.

L1 cache: Private memory for each processor core.

L2, L3, etc. and main RAM memory: Public memory shared across all processors.

Cache Block: The basic unit for cache storage. It may contain multiple bytes/words of data.

Cache Line: Cache is divided into uniform size blocks, also called cache lines. A cache "line" contains one or more State Tags and the associated Data (e.g., 64 bytes). Note that this is not the same thing as a "row" of cache.

Cache Set: A "row" in the cache. The number of blocks per set is determined by the layout of the cache (e.g., direct mapped, set-associative, or fully associative).

Cache Tag: A unique identifier for a group of data. Because different regions of memory may be mapped into a block, the Tag is used to differentiate between them.

Cache Line Valid Bit: A bit of information on an address that indicates whether the data in a cache block is valid (1) or not (0).

Cache Coherency: A system or methodology that ensures changes in the values of shared operands (data) are propagated throughout the system in a timely fashion. It requires uniformity of shared resource data that is stored in multiple local caches. Coherency ensures that all processors, or masters in the system, see the same view of memory across multiple caches.

Cache Coherence Problem: It is the challenge of keeping multiple local caches synchronized when one of multiple processors updates its local copy of data that was shared among multiple local caches.

Interleaving: A way to spread memory transactions across multiple memory channels.

Snooping: First introduced in 1983, snooping is a process or system where the individual caches monitor address lines for read/write accesses to memory locations that they have cached.

Snoop Filter: A scheme by which a coherency controller (snooper) in a cache (a snoop cache) monitors or snoops to maintain cache coherency. A snoop filter can be a directory-based structure and monitors all coherent traffic in order to keep track of the coherency states of cache blocks. A typical snoop filter maintains a cache of requests from each processor (or core) to track the contents of the private cache (L1) of each processor (or core). Then the snoopers look up their corresponding cache tag to check whether it has the same cache block.

Snoop Cache: A cache that contains a coherency controller.

Cache Affinity: When the cache of a CPU represents a current memory set used by a Task, there is said to be "cache affinity" with that Task.

Processor Affinity: Processor affinity enables the binding and unbinding of a process or a thread to a central processing unit (CPU) or a range of CPUs, so that the process or thread will execute only on the designated CPU or CPUs, rather than on any CPU.

Snoop Protocols: Instructions that distribute the responsibility for cache coherence between all cache controllers. The goal is that two clients must never see different values for the same shared data.

Write-Invalidate: A snoop protocol, when a write operation is observed to a location that a cache has a copy of, the cache controller invalidates its own copy of the snooped memory location, which forces a read from main memory of the new value on its next access.

Write-Update: A snoop protocol, when a write operation is observed to a location that a cache has a copy of, the cache controller updates its own copy of the snooped memory location with the new data.

Cache Coherence Agent: A hardware component and/or a software program that enables cache coherency across multiple caches.

Cache Coherence Interconnect: A hardware-based interconnect or network-on-chip (NoC) having a coherent interconnect protocol that enables hardware coherency, without having to use complicated cache maintenance software.

Master Data: an original instance of data stored in memory (as opposed to a "replica", which is a copy of the master data).

Hardware Coherency: Hardware components that manage sharing cache memory automatically, which can simplify software demands.

Tracking: monitoring traffic of transactions or messages.

The various aspects and embodiments of the invention apply to interconnects, including cache coherent interconnects, that implement a snoop filter. A snoop filter is a component, which may be implement in hardware or software or both, that stores the state of the various cache lines in the coherent agents. When a coherent agent stores a cache line in its cache, the snoop filter is storing the information that this particular cache line may be inside this agent's cache. The snoop filter also tracks the state of the cache line, which depend on the kind of coherent protocol used, but can typically be one of: Modified, Invalid, Shared, Exclusive, Unique, and so on. A snoop filter keeps track of cache line locations and states through exchange of messages between the various components of the interconnect, which are connected to cache coherent agents and memory, the cache coherent agent's interfaces, and the memory interface.

In a large system with many coherent agents, the rate of messages going to and from the snoop filter can become very large. To keep the message bandwidth adequate for the kind of performances required by the system, a typical solution is to partition the snoop filter into multiple snoop filters, which will then work in parallel with each other. For the partitioning to work correctly, that is, for each snoop filter to work in parallel with the others, each snoop filter needs to keep track of a unique sub-set of cache line addresses, so that one cache line is tracked by one, and only one, snoop filter, and all snoop filters combined can track all cache lines of the coherent address space.

The typical way of partitioning the snoop filter into multiple snoop filters, is to select a snoop filter partition with a specific value of some bits of the cache line address; typically, the address bits after those bits that address a byte inside a cache line.

Referring now to FIG. 1, in accordance with some aspects and embodiments of the invention, if a cache line is 64 bytes, which is $2^6$, then address bits 0 to 5 cannot be used to address a cache line; only bit 6 and above are used to address a cache line. If the snoop filter is partitioned into 4 snoop filters, then address bits [7:6] can be used to specify what partitioned portion of the snoop filter is used for a tracking cache lines with a specific value. For example, the snoop filter 0 is tracking all the cache lines whose address bits [7:6]=00b. The snoop filter 1 is tracking all cache lines whose address bits [7:6]=01b. The snoop filter 2 is tracking all the cache lines whose address bits [7:6]=10b. The snoop filter 3 is tracking all the cache lines whose address bits [7:6]=11b. In accordance with some aspects and embodiments of the invention, any address bit(s) (starting from address bit [6]) can be used as snoop filter selection.

In accordance with some aspects and embodiments of the invention, this arrangement of snoop filter partitions addressed using address bits, result in traffic going from all coherent agents or all memory interfaces, to all snoop filters. In a large system, if some affinity exists between a cluster of cache coherent agents and a range of address in the global address map, which result in most of the cache lines stored by the set of cache coherent agents in the cluster to come from a specific range of addresses that are not overlapping with other clusters in the system and have affinity with their own range of addresses, simply partitioning the snoop filter by address bits can be less efficient because even if clusters have most of their traffic with a specific range of addresses, all agents in the clusters need to send and receive messages from all snoop filters.

Figure 2:
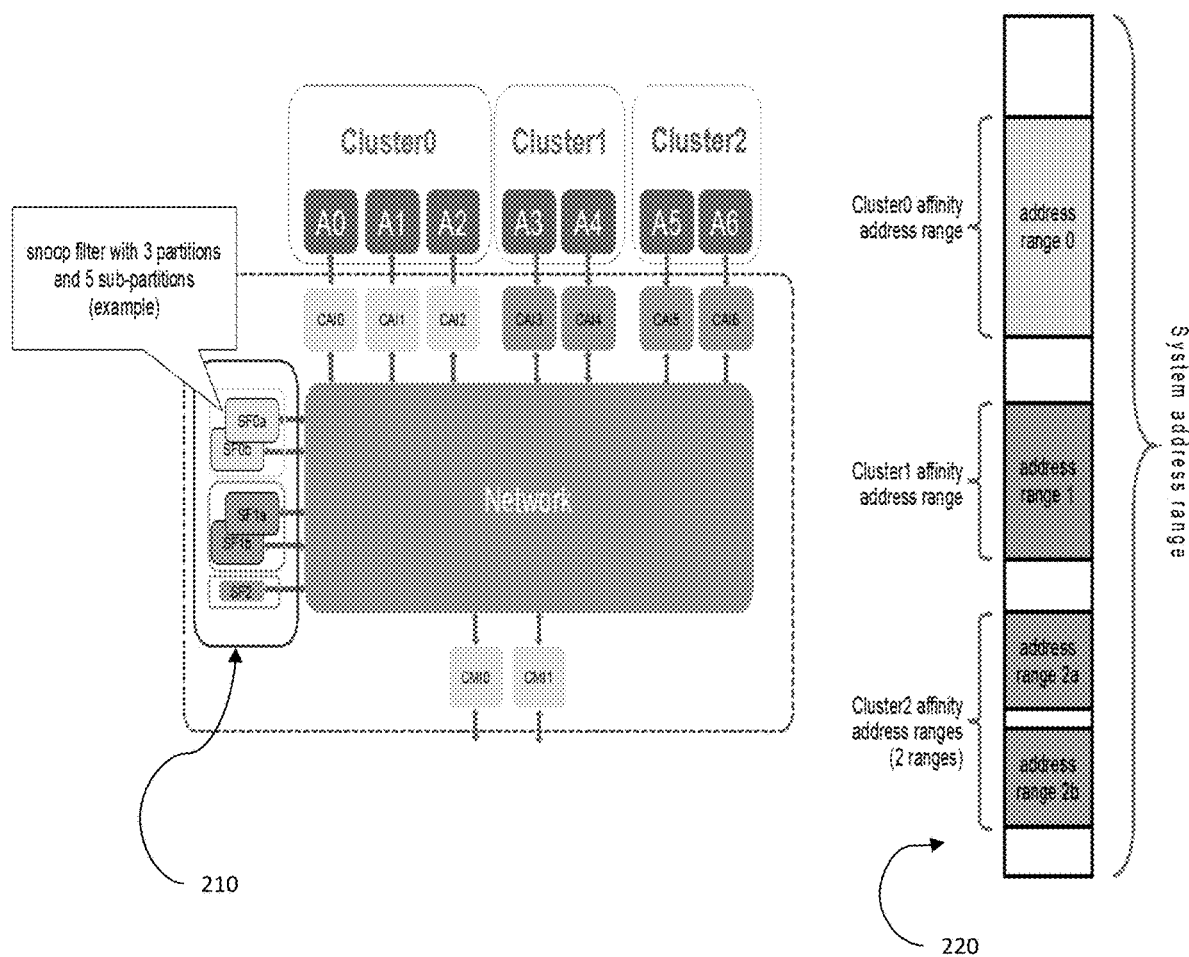
FIG. 2 shows a partitioning of a snoop filter in accordance with various aspects and embodiments of the invention.

Referring now to FIG. 2, in accordance with some aspects and embodiments of the invention, a snoop filter is partitioned using memory mapping, which reflects the affinity between a given cluster of cache coherent agents. The partitioning reduces the traffic between a cluster of cache coherent agents and the different snoop filters to a sub-set of snoop filters. This subset can then be located on the integrated chip (IC) close to the cluster of cache coherent agents, thereby reducing the distance the messages need to travel to and from the cache coherent agent from and to the snoop filters.

In accordance with some aspects and embodiments of the invention, the system-on-chip (SoC) is examined and a set of clusters of cache coherent agents is built. Cache coherent agents in one cluster need to have most of their traffic to memory to come from one or multiple address ranges, which do not overlap with each other. Each cluster is then associated with a unique set of address ranges, to which it is said they have "affinity".

Then the global snoop filter function is implemented using sub-filters, each managing a unique set of addresses from the total set of addresses of the system address space. The sub-filters will have two levels of partitioning: a first level will match the set of identified clusters. The second, optional level, can use address bit(s) for partitioning.

Continuing with FIG. 2, a snoop filter 210 is shown with three partitions and five sub-partitions as a non-limiting example in accordance with an embodiment of the invention. A memory map 220 is shown with three clusters. In accordance with some aspects and embodiments of the invention, each cluster of memory has an affinity with one or more range of addresses. In accordance with some aspects and embodiments of the invention, no two clusters can have affinity to the same range of addresses. In this non-limiting example, cluster 0 has affinity with range 0, cluster 1 with range 1, and cluster 2 with ranges 2a and 2b, etc. The snoop filter 210 is then partitioned as follows: an initial or a first-level of partitioning is done per cluster. The first partition is assigned to cluster 0 and will therefore track cache lines at addresses that belongs to range 0. The second partition is assigned to cluster 1 and will therefore track cache lines at addresses that belongs to range 1. The third partition is assigned to cluster 2 and will therefore track cache lines at addresses that belongs to both range 2a and range 2b.

In accordance with various aspects and embodiments of the invention, there is a common address range, such as range 3 (not shown). The common address range between clusters are served by a dedicated filter partition, or the common address range can be served by one of the existing filter partition. In accordance with various aspects and embodiments of the invention, each cluster works on/with its unique address range for performance reasons, especially if there is an affinity to multiple clusters.

In accordance with some aspects and embodiments of the invention, a second level of partitioning is implemented, which increases the bandwidth of messages to/from one of the snoop filters cluster-level partitions. The second level of partitioning uses address bits, which are for addresses within the range of that partition. This is illustrated for SF0 and SF1, which are both sub-partitioned into two sub-filters, each using e.g., address bit 7 to select which of sub-filter a or b is used to track a particular cache line. In accordance with some aspects and embodiments of the invention, SF0 is partitioned into two second-level or sub-level snoop filter clusters SF0*a* and SF0*b*. In accordance with some aspects and embodiments of the invention, SF1 is partitioned into two sub-level snoop filter clusters SF1*a* and SF1*b*.

In accordance with various embodiments and aspects of the invention, additionally, or alternatively, a third-level of partitioning, in addition to the two-levels described above is implemented. Each interleaving level snoop filter can be further divided by a master-level snoop filter, so that the given master-level snoop filter tracks cache lines: (1) within an address range (2) for lines matching a certain criteria on the cache line address minus the start address of the address range and (3) stored within a master of the cluster with affinity to that address range.

In accordance with some aspects and embodiments of the invention, for a large cache coherent system where the set of cache coherent agents, which are connected to a cache coherent interconnect (NoC), can be grouped into clusters. The cache coherent agents in a cluster are using mostly cache lines from a range of addresses and the bandwidth of messages within the cache coherent interconnect to the snoop filter. In this non-limiting example of a large cache coherent system, more than one snoop filter is needed, which are all working in parallel. To sustain the bandwidth required by the performance expected from the system, the design tool for the system will define how many snoop filters are needed and the snoop filter tracking which cache lines. This allows creation of a hierarchy of snoop filters with two levels: one at the cluster level and one at the interleaving level. In accordance with some aspects and embodiments of the invention, at the cluster level, the design tool defines groups of snoop filters. There will be as many cluster level snoop filters groups as there are clusters identified in the system.

In accordance with some aspects and embodiments of the invention, a cluster does not require nor need to have associated cache coherent agents and it can be simply a set of ranges of addresses that are clustered.

In accordance with some aspects and embodiments of the invention, at interleaving level, each group of cluster-level snoop filters is further subdivided into interleaving level snoop filters, each such interleaving level snoop filter tracking a sub-set of address that belongs to the address range with affinity to the cluster. Thus, no two interleaving level snoop filters of a cluster level track the same address so that all interleaving level snoop filters of a cluster level track all addresses within the address range with affinity to the cluster.

Figure 3:
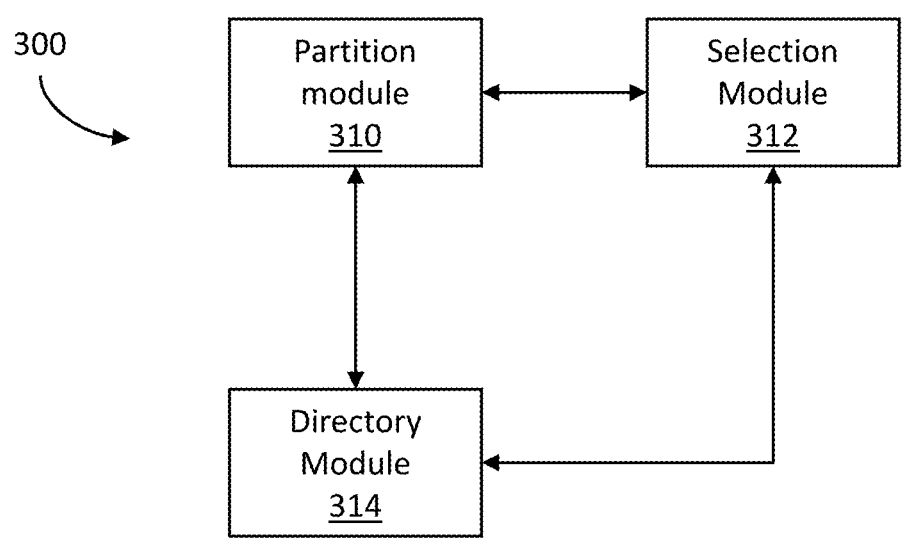
FIG. 3 shows a snoop filter in accordance with various aspects and embodiments of the invention.

Referring now to FIG. 3, in accordance with various embodiments and aspects of the invention, a snoop filter 300 is shown in accordance with some aspects and embodiments of the invention. The snoop filter 300 includes a partition module 310 for partitioning a snoop filter into a sub-set of snoop filters based on affinity; a selection module 312 in communication with the partition module, wherein the selection module selects one sub-set snoop filter of the sub-set of snoop filters; and a directory module 314 in communication with the partition module 310 and the selection module 312 for tracking the location and state of cache lines inside the set of connected cache-coherent agents, or a unique set of ranges of addresses, by using the sub-set of snoop filters.

In accordance with some aspects and embodiments of the invention, the snoop filter is partitioned into multiple snoop filters, each snoop filter tracking a unique set of addresses. The selection of a snoop filter that will track a specific cache line with address A is made using a selector function: SF_SEL(A). The selector function assigns all addresses within one or more address range, which is a subset of addresses of the totality of addresses of the cache lines tracked by the snoop filters, to a unique "cluster-level" set of snoop filters. In accordance with some aspects and embodiments of the invention, the selection can be further made, within an address range, using a selector function on the cache line address minus the start address of the address range.

Figure 4:
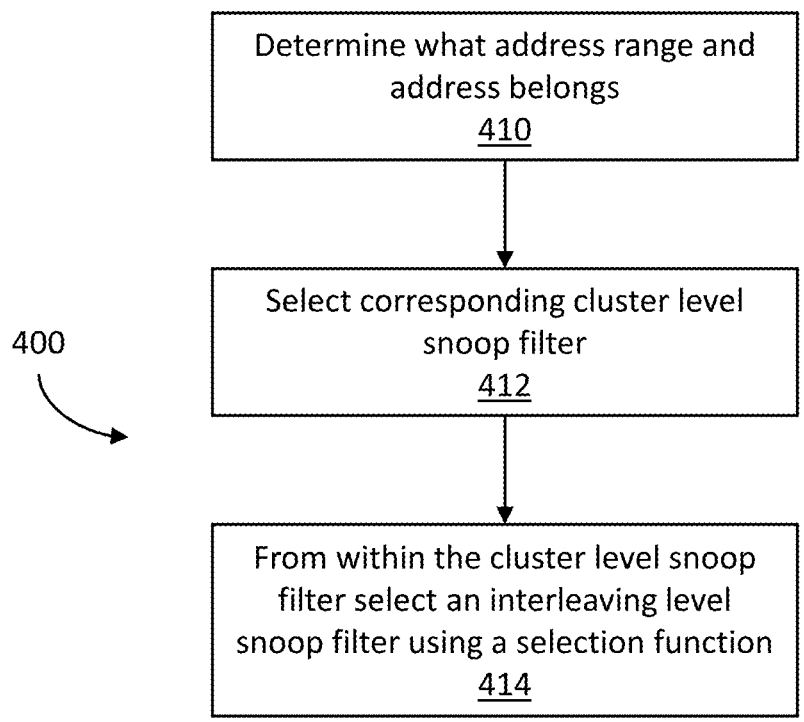
FIG. 4 shows a process for partitioning a snoop filter in accordance with various aspects and embodiments of the invention.

Referring now to FIG. 4, a process 400 is shown for interleaving a snoop filter clusters in accordance with some aspects and embodiments of the invention. Given an address for a cache line, in order to select a snoop filter for tracking, at step 410 the process determines to what address range the address belongs. At step 412, the process selects the cluster level snoop filters group based on the determine address range that the address belongs. At step 414, The process then, from within the cluster level snoop filters group, selects the interleaving level snoop filter that is tracking the corresponding address by applying a selection function to the cache line address minus the start address of the matching address range. In accordance with some aspects and embodiments of the invention, the selection function is a lookup on certain address bits. In accordance with some aspects and embodiments of the invention, the selection function is a modulo function, typically for a non-power of 2 number of interleaving level snoop filters.

Certain methods according to the various aspects of the invention may be performed by instructions that are stored upon a non-transitory computer readable medium or memory and executed by a processor. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

What is claimed is:

1. A method for partitioning a snoop filter in a cache coherent system having cache coherent agents in communication through a cache coherent interconnect, the method comprising:
    tracking a location and a state of a plurality of cache lines accessed by the cache coherent agents using the snoop filter;
    partitioning the snoop filter into a first-level of snoop filter clusters based on affinity between a group of cache coherent agents and an address range selected from a system address range, wherein no two first-level of snoop filter clusters have affinity to identical address ranges;
    partitioning at least one of the first-level of snoop filter clusters into a second-level of snoop filter clusters;
    assigning each of the second-level of snoop filter clusters to a second sub-address range selected from the address range associated with the at least one of the first-level of snoop filter clusters that was partitioned; and
    performing a third level of snoop filter partitioning such that an interleaving level snoop filter is further divided by a master-level snoop filter that tracks cache lines.

2. The method of claim 1, wherein the cache coherent agents are grouped into clusters based on affinity to the address range and the first-level of snoop filters in a specified cluster have affinity to the address range based on the cache coherent agents.

3. The method of claim 1, wherein the first-level of snoop filter clusters are further subdivided into interleaving level snoop filters.

4. The method of claim 3, wherein each interleaving level snoop filter tracks a sub-set of addresses that belongs to an address range with affinity to a cluster such that no two interleaving level snoop filters of each first-level of snoop filter cluster level track the same address and all interleaving level snoop filters of each first-level of snoop filter cluster level track all addresses within the address range having affinity to each first-level snoop filter cluster.

5. The method of claim 1, wherein a common address range between the first-level snoop of filter clusters are served by a dedicated filter partition.

6. The method of claim 1, wherein partitioning the snoop filter includes identifying a group of cluster level snoop filters by determining to which address range an address belongs.

7. The method of claim 6, wherein within the group of cluster level snoop filters, selecting an interleaving level snoop filter that tracks a corresponding address by applying a selection function to a cache line address minus a start address of a matching address range.

8. The method of claim 1 further comprising using the snoop filter to track cache line locations and states through exchanges of messages between various components of the interconnects that are connected to cache coherent interconnects and memory.

9. The method of claim 1, wherein the first-level of snoop filter clusters work in parallel with each other.

10. The method of claim 1, wherein each first-level snoop filter keeps track of a unique sub-set of cache line addresses and wherein one cache line is tracked by one, and only one, snoop filter and all snoop filters, when combined, track all cache lines of the cache coherent system's address space.

11. The method of claim 1, wherein partitioning the snoop filter includes selecting a first-level snoop filter from the first-level of snoop filter clusters using a specific value in the cache line address.

12. The method of claim 1 further comprising implementing a global snoop filter function using sub-filters, wherein each sub-filter manages a unique set of addresses from addresses of the system's address space.

13. The method of claim 1, wherein partitioning the snoop filter increases the bandwidth by using address bits to select same cluster-level snoop filters within a partition that access addresses within the range of the partition thereby reducing snoops sent to/from the cache coherent agents.

14. A computer-implemented method of using cache coherent snoop filters to ensure coherency within a system, comprising:
    partitioning a cache interconnect snoop filter into a plurality of sub-sets of multiple snoop filters based on affinity;
    selecting one sub-set snoop filter from the plurality of sub-sets of multiple snoop filters;
    tracking a location and state of cache lines located inside a sub-set of connected cache-coherent agents, or a unique set of ranges of addresses, by using the plurality of sub-sets of multiple snoop filters; and
    identifying a group of same cluster level snoop filters by determining to which address range an address belongs; and
    selecting, within the group of same cluster level snoop filters, an interleaving level snoop filter that tracks a corresponding address by applying a selection function to a cache line address minus a start address of a matching address range,
    wherein each of the plurality sub-sets of multiple snoop filters track a unique sub-set of cache line addresses, and
    wherein all of the plurality sub-sets of multiple snoop filters work in parallel with each other.

15. A method for partitioning a snoop filter in a cache coherent system having cache coherent agents in communication through a cache coherent interconnect, the method comprising:
    tracking a location and a state of a plurality of cache lines accessed by the cache coherent agents using the snoop filter;
    partitioning the snoop filter into a first-level of snoop filter clusters based on affinity between a group of cache coherent agents and an address range selected from a system address range, wherein no two first-level of snoop filter clusters have affinity to identical address ranges and identifying a group of cluster level snoop filters by determining to which address range an address belongs;
    partitioning at least one of the first-level of snoop filter clusters into a second-level of snoop filter clusters;
    assigning each of the second-level of snoop filter clusters to a second sub-address range selected from the address range associated with the at least one of the first-level of snoop filter clusters that was partitioned; and
    selecting, within the same group of cluster level snoop filters, an interleaving level snoop filter that tracks a corresponding address by applying a selection function to a cache line address minus a start address of a matching address range.

* * * * *